Jan. 30, 1934.  H. HASTINGS  1,945,400
THERMOMETER
Filed July 29, 1932
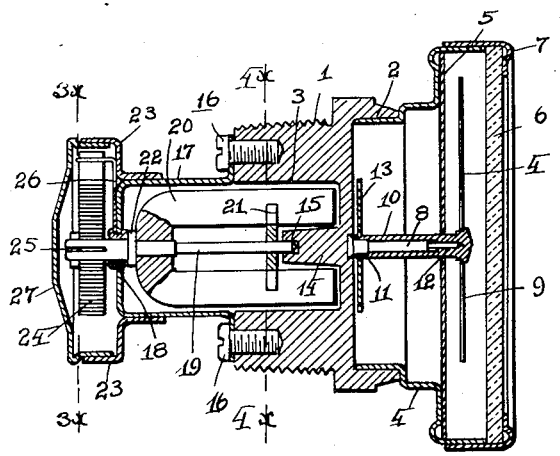
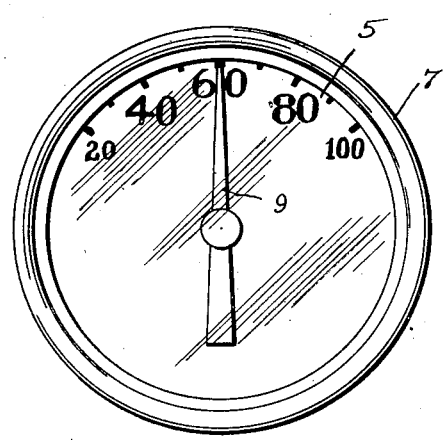
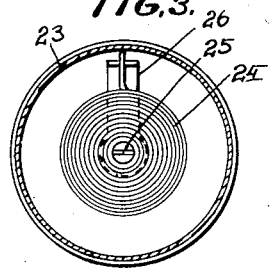
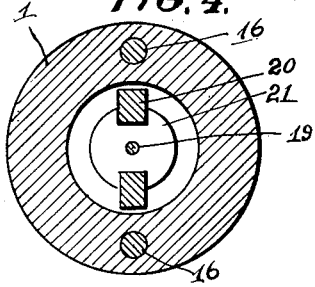
INVENTOR
HERBERT HASTINGS
BY
ATTORNEY Patented Jan. 30, 1934

1,945,400

UNITED STATES PATENT OFFICE 1,945,400

THERMOMETER

Herbert Hastings, Brighton, N. Y.

Application July 29, 1932. Serial No. 625,680

3 Claims. (Cl. 73—118)

This invention relates to bimetallic thermometers and has for its object to provide a new and improved construction and operating mechanism for such a thermometer to make the same adaptable for mounting on tanks or other containers, to continually indicate the temperature of liquids, semi-liquid or gases within the container.

Another object of this invention is to separate the indicator of the thermometer from the thermoresponsive element thereof by an imperforate wall and to transmit the movement of the thermoresponsive element to the indicator thru said imperforate wall to prevent the breaking or non-functioning of any of the operating members of the thermometer from creating a leak thru the thermometer housing.

These and other objects of this invention will become more apparent from the detailed description of one embodiment thereof reference being had to the accompanying drawing in which Figure 1 is a longitudinal sectional view of the thermometer.

Figure 2 is a front elevation thereof.

Figure 3 is a sectional view of the thermometer, the section being taken on the line $3x$—$3x$ of Figure 1.

Figure 4 is a sectional view of the thermometer, the section being taken on the line $4x$—$4x$ of Figure 1.

In the several figures of the drawing like reference numerals indicate like parts.

The thermometer, in accordance with this invention, comprises the body member 1 which is preferably made of a non magnetic metal with a recess 2 provided at one end and a recess 3 provided at the other end thereof with an imperforate wall therebetween. Into the recess 2 is nested the reduced inner end of the dial housing 4. The dial 5 is suitably mounted in this housing and the crystal 6 is clamped against the enlarged outer end of the dial housing by means of the bezel 7 and closes the dial housing in front of the dial.

Anchored in the body member 1 centrally of the recess 2 is the pivot stem 8 on which the pointer or indicator 9 is mounted to oscillate. For this purpose the pointer is provided with an elongated hollow hub 10 which surrounds the pivot stem 8 and is provided with a small bearing surface at each end at 11 and 12 so as to freely and rotatably support the pointer on the pointer stem. The hollow hub 10 of the pointer projects thru the dial 5 and carries at the inner end in close proximity to the body member 1 the magnetized follower 13 for a purpose that will presently appear.

In the recess 3 of the body member 1 and concentric with the pivot stem 8 is a boss 14 in which is provided the bearing 15. Fastened to the body member 1 by means of the screws 16, 16 is the magnet housing 17. This housing forms a continuation of the recess 3 and in the closed end of this housing is provided the bearing sleeve 18 in line with the bearing 15 to permit the pivot shaft 19 of the magnet 20 to be rotatably supported between them. The magnet 20 is U shaped and near the open end thereof is mounted the supporting washer 21 which bridges the gap between the poles of the magnet. The pivot shaft 19 passes thru a hole in the center of the washer 21 and thus supports the pole end of the magnet by means of this washer within the recess 3 close to the bearing 15 provided in the boss 14 of the body member.

The pivot shaft 19 also supports the closed end of the magnet 20 and a shoulder 22, provided on the shaft between the closed end of the magnet and the bearing sleeve 18, holds the shaft and the magnet against endwise movement within the magnet housing. The end of the pivot shaft which passes thru the bearing sleeve 18 has an increased diameter and this enlarged continuation of the shaft extends into the housing 23 in which the thermoresponsive member 24 is attached thereto. This member comprises a suitable bimetallic coil spring, the inner end of which is fastened into the slot 25 of the enlarged end of the pivot shaft 19. The outer end of the thermoresponsive bimetallic spring 24 is held in the bifurcated end of the arm 26 which is pivoted on the bearing sleeve 18 and is frictionally held thereon so that the arm can be moved in either direction for the calibration of the thermoresponsive bimetallic coil spring relative to the dial markings.

The housing 23 encircles the thermoresponsive element and its reduced inner end is telescopically held in place on the end of the magnet housing 17. A cover 27 is nested into the housing in front of the thermoresponsive element to close it and provide a sealed chamber within which the thermoresponsive element is free to operate on the rise and fall of the temperature without the housing.

From the foregoing description it will be apparent that the operation of the thermoresponsive bimetallic coil spring oscillates the pivot shaft 19 and with it the magnet 20, while the action of the magnetic field of the magnet on the magnetized follower 13 transmits this oscillating movement of the magnet to the pointer 9 which in turn indicates on the dial 5 the rise and fall of the temperature which has actuated the thermoresponsive element. The follower 13 may be eliminated by placing the dial immediately next to the outer face of the imperforate wall and shortening the hub 10 so that the pointer 4 thus becomes the follower.

I claim:

1. A thermometer comprising a body member having an imperforate nonmagnetic wall, a dial housing supported on said body member on one side of said wall, a magnet housing supported on said body member on the opposite side of said wall, a pivot stem anchored in said wall and projecting into said dial housing, a magnet mounted to oscillate in said magnet housing, a thermoresponsive element connected to said magnet and a third housing surrounding said thermoresponsive element and supported on said magnet housing.

2. A thermometer comprising an indicator housing and a magnet housing, a nonmagnetic member separating said housings, a thermoresponsive element housing, a pivot shaft rotatably mounted in said magnet housing and projecting into said thermoresponsive element housing, a magnet mounted on said pivot shaft within said magnet housing, a thermoresponsive element connected to said shaft within said thermoresponsive element housing, and an indicator carrying a magnetized follower mounted in said indicator housing and operated by said magnet thru said nonmagnetic wall.

3. A thermometer comprising an indicator housing and a magnet housing provided with a non-magnetic partition for separating said housing, a thermoresponsive element housing, a pivot shaft rotatably mounted in said magnet housing and projecting into said thermoresponsive element housing, a magnet mounted on said pivot shaft within said magnet housing, a thermoresponsive element connected to said shaft within said thermoresponsive element housing and an indicator carrying a magnetized follower mounted in said indicator housing and operated by said magnet thru said nonmagnetic partition of said magnet housing.

HERBERT HASTINGS.